Figure 1:
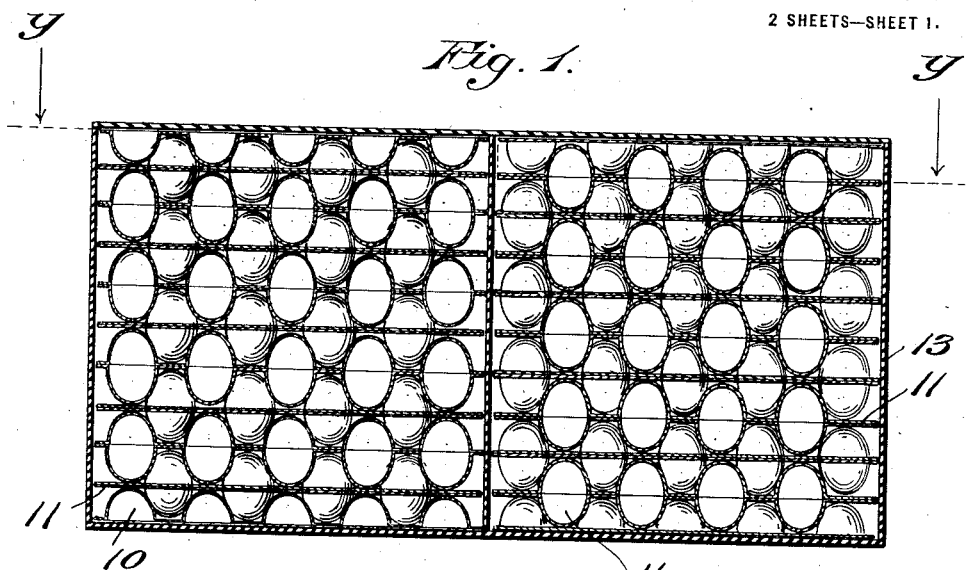

E. R. GILL.
PACKING DEVICE.
APPLICATION FILED JAN. 13, 1913.

1,214,451.

Patented Jan. 30, 1917.

2 SHEETS—SHEET 1.

Witnesses:
Edward C. Rowland
Katharine C. Mead

Edwin R. Gill Inventor
By his Attorneys
Wilkinson, Witherspoon and MacKaye

E. R. GILL.
PACKING DEVICE.
APPLICATION FILED JAN. 13, 1913.

1,214,451.

Patented Jan. 30, 1917.

2 SHEETS—SHEET 2.

Edwin R. Gill, Inventor

Witnesses:
Edward Rowland
Katharine C. Mead

By his Attorneys
Wilkinson, Witherspoon and MacKaye

UNITED STATES PATENT OFFICE.

EDWIN R. GILL, OF YONKERS, NEW YORK, ASSIGNOR TO SEAMLESS PRODUCTS CORPORATION, A CORPORATION OF NEW YORK.

PACKING DEVICE.

1,214,451.   Specification of Letters Patent.   Patented Jan. 30, 1917.

Application filed January 13, 1913. Serial No. 741,816.

*To all whom it may concern:*

Be it known that I, EDWIN R. GILL, a citizen of the United States, residing at Yonkers, in the county of Westchester and State of New York, have invented certain new and useful Improvements in Packing Devices; and I do hereby declare the following to be a full, clear, and exact description of the invention, such as will enable others skilled in the art to which it appertains to make and use the same.

The transportation and storage of fruits, eggs and similar perishable material has hitherto been attended with very serious losses, particularly in the case of eggs. The main source of loss is found, in the case of eggs, in the large percentage of breakage. An attendant loss is found in the spreading and putrefaction of the egg contents through the crate in cases of breakage, whereby the breaking of one or two eggs causes loss of others. In the shipping of fine and delicate fruits, such as peaches and cherries, bruising and consequent rotting of individual specimens is the main source of loss, corresponding to egg breakage; while the transmission of rot from one fruit to another is a secondary source of loss corresponding to spread of the contents of eggs actually broken.

In practice it is highly desirable that the problem of preventing or lessening these losses should be solved consistently with the use of established standard containers or crates, and in accordance with established modes of doing business. In the sale of eggs, for instance, the standard crate contains thirty dozen, divided into two halves, each contained in a space of substantially square horizontal section. A completely successful solution of the problem of egg transportation, therefore, should be adapted to continued use of these standard crates of thirty dozen.

My present invention relates to means for accomplishing the above named ends; and the principal objects of the invention are, first, to reduce breakage of eggs and bruising of fruit during transportation to a minimum and second, to prevent such breakage or bruising as may occur from spreading contamination to other provisions in the same crate or parcel.

A further object of my invention is to provide packing units which may be easily adapted to retain delivery or transmission by mail, as well as to provide means whereby packing units of various desired sizes may be quickly formed at will from semiprepared materials on hand.

Certain preferred embodiments of my invention are illustrated in the accompanying drawings, wherein—

Figure 2:
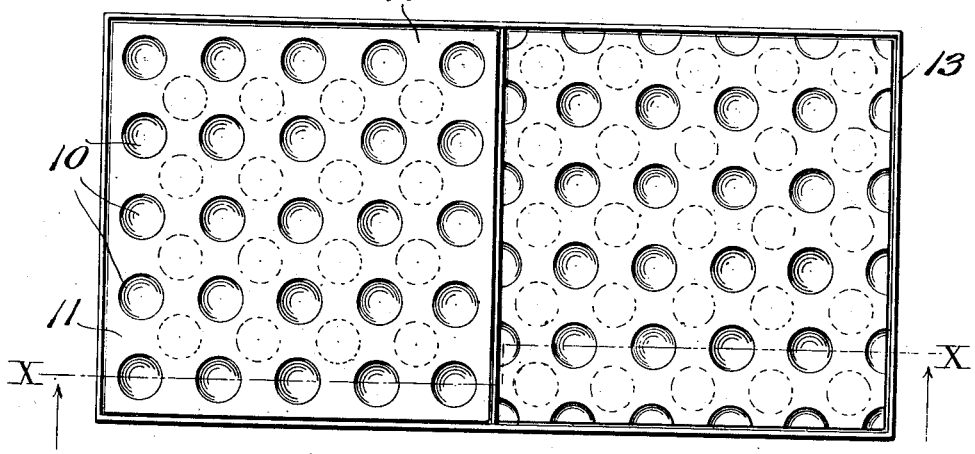
Figure 3:
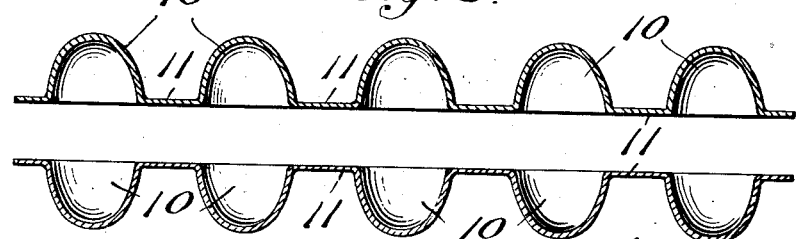
Figure 4:
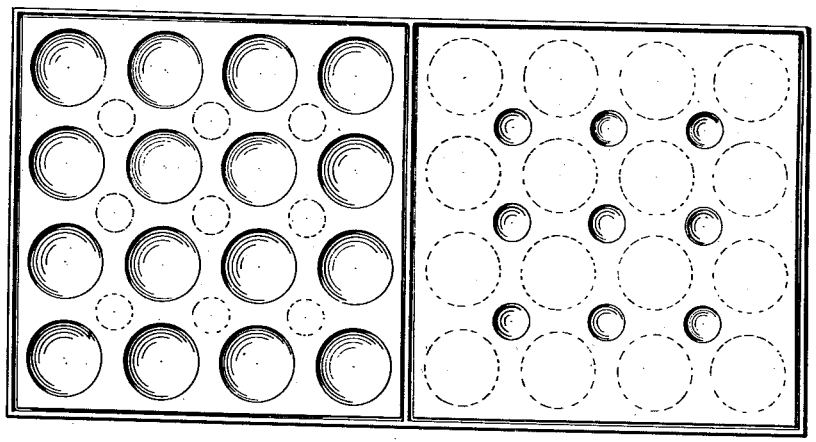
Figure 5:
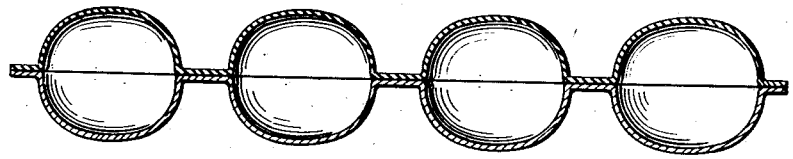
Figure 6:
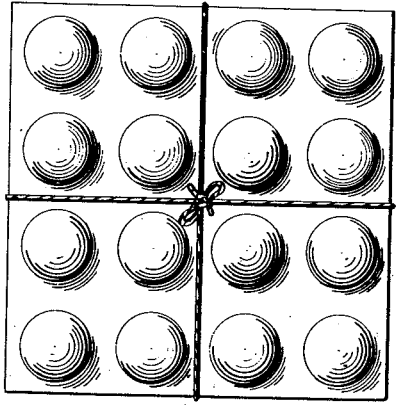
Figure 7:
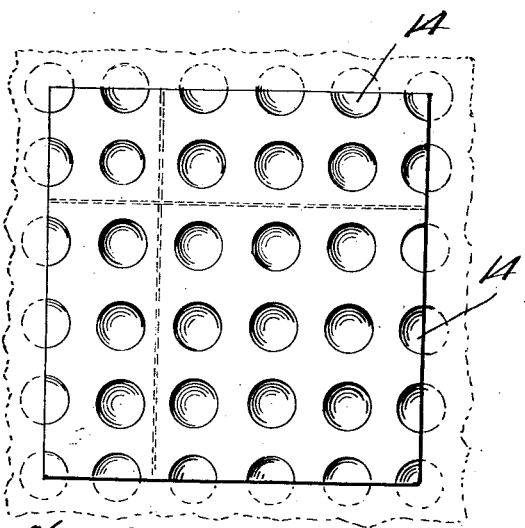

Figure 1 is a vertical section, on the plane $x$—$x$ of Fig. 2, of a thirty dozen egg crate made in accordance with the invention, Fig. 2 is a horizontal section of the same on the plane $y$—$y$ of Fig. 1, Fig. 3 shows in section two elementary sheets face to face slightly separated with half cells "in opposition," Fig. 4 is a view similar to Fig. 2 with respect to a modified form intended for fruit, Fig. 5 is a section of a packing unit made with a modified form of cell suited to fruit, Fig. 6 is a top view of a possible and convenient form of packing unit for mailing or retail delivery, and Fig. 7 is a face view of a packing element showing in dotted lines its mode of production from an indefinite sheet made in accordance with my invention.

The preferred material used is wood pulp or its equivalent, such as strawboard, etc., and I prefer to produce this primarily directly from a suitable pulp in sheets of indefinite extent comprising half cells 10 united by webbing 11. These cells are embossed or formed in any suitable manner in the general sheet, and are preferably in straight rows at uniform distances apart, as shown in Figs. 1, 2 and 3, for instance. The half cells, being thus formed, are made "complementary," whereby I mean that they are so disposed with relation to each other that, when two such sheets are placed face to face, as in Fig. 3, they may be brought together with the openings of one set of half cells registering with those of the other set, to form entire cells as shown in Figs. 1 and 5. Any arrangement of half cells which permits this to be done produces "complementary" half cells in the sense of my claims.

It is clear that, where an indefinite sheet of this kind is produced, there is provided a semi-prepared raw material which can be at once converted into packing units of many kinds at will, by merely cutting off portions of the sheet along proper lines. For instance, a grocer could be provided with wide sheets of half cells of the general character described, and, by cutting out two squares of sixteen half cells in the manner shown in Fig. 6, and tying them together, as shown in Fig. 5, he would produce a packing unit of sixteen whole cells. In each cell an egg or a peach or orange (for instance) could be placed, and they could thus be safely transported.

Where several units are to be united for packing together, it is best to so space the half cells that two elements may be placed back to back with the half cells of one alternating in staggered relation with those of the other unit. In Figs. 1 and 2 I have shown how this is carried out in that particular modification of my invention which is intended for adaptation to the standard thirty dozen egg crate. In carrying out this embodiment of the invention, I prefer to shape the half cell, as shown in the first three figures, so that each cell can accommodate a single egg with its longer diameter in a vertical position, the elementary sheets lying horizontal.

The section line y—y passes through the right hand section of the crate 13 between two facing sheets; while, on the left side of the crate, this line runs over the top elementary sheet, or as much higher as the depth of a half cell plus the thickness of a sheet web. Inspection of Figs. 1 and 2 will show that each half of the crate 13 is occupied by successive horizontal layers of sheet elements in the following order: On the right side at the bottom is a sheet of twenty-five half cells face down. This acts as a strong and resilient shield, lessening all shocks from below. Upon this lies a sixteen cell element face up, with the sixteen half cells alternating in staggered relation with the twenty five half cells of the lowermost or shielding element. Next comes a sheet just like sheet number 2, but face down, so as to form a packing unit like that shown in Fig. 6. One difference exists here, however, which is indicated in Fig. 7. That is to say, the square is cut from the main sheet indicated in dotted lines so as to form a square of the same dimensions as the twenty-five cell sheet, filling the half crate. This forms quarter cells 14 all around the square whereby the resilience of the edges is increased and the whole group is better fitted to resist side shocks. The alternation of horizontal units, first of sixteen and then of twenty-five is continued in the same manner upward, and at the top is laid a final shielding element face up. The left side is similarly packed. I have found that by adopting this arrangement in a thirty dozen crate of standard dimensions, I can place within each half of the crate 13 five units of sixteen cells (or 80 eggs) and four units of twenty-five cells (100 eggs). Each half thus accommodates 180 eggs, or fifteen dozen, and thus the thirty dozen total is packed within standard dimensions. By using five units of twenty-five cells and four units of sixteen cells, the capacity of the standard egg crate can be actually increased. At the same time every egg is protected from breakage at its ends by a quadruple thickness of sheeting, and elsewhere by a double resilient curved wall. It is an important advantage of my preferred invention that the dome-shaped cells present curved holding surfaces everywhere, and there is thus produced a distribution of pressure in case of shock which goes far to prevent breakage.

In Fig. 4, is shown a modification whereby large cells in units of, say, sixteen can be alternated with units of nine small cells. Such an arrangement would be useful in packing peaches, for instance, with cherries and the like.

The arrangement shown in Fig. 1 involves the packing of resilient units quite tightly and the pressure incident to this packing would produce fairly tight cells which would in some cases, sufficiently isolate the individual articles packed. I prefer, however, to provide means for hermetically and conveniently sealing each cell, thus preventing all possibility of contamination of the contents of any cell from injured articles in other cells. For this purpose the spaces between the cells are prepared for sticking the contiguous facing elements together. The preferred method of accomplishing this is by the impregnation of the entire sheet (or if desired of the webbing between cells alone) with paraffin or paraffin-like material, by which is meant a suitable harmless material which softens and becomes adherent on heating. Where such sheets are employed it only becomes necessary after placing two similar elements face to face, to apply heat with a hot tool between the cells. For instance along the lines shown dotted in Fig. 7. This causes the sheets to adhere strongly and forms units with hermetically sealed cells.

Other means for causing adherence and consequent sealing are within my invention.

Various changes may be made in my improved devices without departing from the scope of my invention, and I do not limit myself to the details herein shown and described.

What I claim is—

1. In a packing crate for eggs, fruit and like articles, a tier of superimposed holding units each consisting of a pair of approximately square sheets of like size, the sheets of a unit being superimposed and having complementary half cells to form entire cells, each for holding an article singly, the cells in each unit being placed uniform distances apart, alternate units having different numbers of cells, the half cells of adjacent sheets of alternating units being in staggered relation to each other and in contact with the opposing sheets to support one unit from the one next below, the cells being dome-shaped and presenting curved holding surfaces, the margins of the sheets of the unit having the larger number of cells being narrow and the margins of the sheets of the unit having the smaller number of cells being wide, the outer marginal cells of the unit having the smaller number of cells lying inside the outer marginal cells of the next following unit having a larger number of cells.

2. In a packing crate for eggs, fruit and like articles, a tier of superimposed holding units each consisting of a pair of superimposed sheets, the sheets of the units being alike in size and each sheet having a plurality of dome-shaped cells, the openings of the cells of the pair of sheets of a unit being in register with each other to form containers for containing the articles singly, alternate units having different numbers of registering cells, the margins of the sheets of a unit having the larger number of registering cells being narrow and the margins of the sheets of a unit having the smaller number of registering half cells being wide, the cells in one unit extending into the spaces between the cells of the next following unit and engaging the corresponding sheets and the dome-shaped cells presenting curved holding surfaces.

3. In a packing crate for eggs, fruit and like articles, an external boxing and a tier of superimposed holding units in the said boxing, each consisting of a pair of sheets, the sheets of all the units being alike in size and fitting into the boxing, each sheet having a plurality of dome-shaped cells, the openings of the cells of the sheets of a unit being in register with each other to form containers for containing the articles singly, each container being ovoidal in shape and elongated in a vertical direction, alternate units having different numbers of cells, the cells in one unit extending in the spaces between cells of the next following unit and engaging the corresponding sheet, the said dome-shaped cells presenting curved holding surfaces, and cushioning sheets, one on top and the other on the bottom of the tier of holding units, the top cushioning sheet abutting against the under side of the top of the boxing and the bottom cushioning sheet resting on the bottom of the boxing, the said cushioning sheets having dome-shaped cells extending in the spaces of the adjacent cells of the bottom and top units and in contact with the corresponding sheets.

4. In a packing crate for eggs, fruit and like articles, an external boxing and a tier of superimposed holding units in the said boxing, each consisting of a pair of sheets, the sheets of all the units being alike in size and fitting into the boxing, each sheet having a plurality of dome-shaped cells, the openings of the cells of the sheets of a unit being in register with each other to form containers for containing the articles singly, each container being ovoidal in shape and elongated in a vertical direction, alternate units having different numbers of cells, the margins of the sheets of the units having the smaller number of cells being wider than the margins of the sheets of the units having the larger number of cells, the cells in one unit extending in the spaces between cells of the next following unit and engaging the corresponding sheet, the said dome-shaped cells presenting curved holding surfaces, and cushioning sheets, one on top and the other on the bottom of the tier of holding units, the top cushioning sheet abutting against the under side of the top of the boxing, and the bottom cushioning sheet resting on the bottom of the boxing, the said cushioning sheets having dome-shaped half cells extending in the spaces of the adjacent cells of the bottom and top units and in contact with the corresponding sheets.

5. In a packing crate for eggs, fruits and like articles, two superimposed units, each unit being formed of two approximately square sheets provided with complementary half cells, the half cells being uniformly spaced apart, the half cells presenting curved holding surfaces, and the apexes of the cells being in contact with the opposed faces of the said sheets, one unit having a larger number of cells than the other unit, the openings of the cells of the sheets of a unit being in register with each other to form containers for containing the articles singly, each container being ovoidal in shape, the elongation being in a vertical direction.

6. In a packing crate for eggs, fruits and like articles, two superimposed units, each unit being formed of two approximately square sheets provided with complementary half cells, the half cells being uniformly spaced apart, the half cells being dome-shaped and presenting curved holding surfaces, the apexes of the cells being in contact with the opposed faces of the said sheets, one unit having a larger number of cells than the other unit, the marginal half cells of one sheet of the unit having the larger number of cells encompassing the marginal half cells of the opposite sheet of the unit having the smaller number of cells, the openings of the cells of the sheets of a unit being in register with each other to form containers for containing the articles singly, each container being ovoidal in shape, the elongation being in a vertical direction.

7. In a packing crate for eggs, fruit and like articles, a tier of superimposed holding units each consisting of a pair of approximately square sheets of like size, the sheets of a unit being superimposed and having complementary half cells to form entire cells, each for holding an article singly, the cells in each unit being placed uniform distances apart, alternate units having different numbers of cells, the half cells of adjacent sheets of alternating units being in staggered relation to and in contact with the opposing sheets to support one unit from the one next below, the margins of the sheets of the unit having the larger number of cells being narrow and the margins of the sheets of the unit having the smaller number of cells being wide, the outer marginal cells of the unit having the smaller number of cells lying inside the outer marginal cells of the next following unit having a larger number of cells.

8. In a packing crate for eggs, fruit and like articles, a tier of superimposed holding units each consisting of a pair of superimposed sheets, the sheets of the units being alike in size and each sheet having a plurality of dome-shaped cells, the openings of the cells of the pair of sheets of a unit being in register with each other to form containers for containing the articles singly, alternate units having different numbers of registering cells, the margins of the sheets of a unit having the larger number of registering cells being narrow and the margins of the sheets of a unit having the smaller number of registering half cells being wide, the cells in one unit extending into the spaces between the cells of the next following unit and engaging the corresponding sheets.

9. In a packing crate for eggs, fruit and like articles, an external boxing and a tier of superimposed holding units in the said boxing, each consisting of a pair of sheets, the sheets of all the units being alike in size and fitting into the boxing, each sheet having a plurality of dome-shaped cells, the openings of the cells of the sheets of a unit being in register with each other to form containers for containing the articles singly, each container being ovoidal in shape and elongated in a vertical direction, alternate units having different numbers of cells, the cells in one unit extending in the spaces between cells of the next following unit and engaging the corresponding sheet, and cushioning sheets, one on top and the other on the bottom of the tier of holding units, the top cushioning sheet abutting against the under side of the top of the boxing and the bottom cushioning sheet resting on the bottom of the boxing, the said cushioning sheets having dome-shaped cells extending in the spaces of the adjacent cells of the bottom and top units and in contact with the corresponding sheets.

10. In a packing crate for eggs, fruit and like articles, an external boxing and a tier of superimposed holding units in the said boxing, each consisting of a pair of sheets, the sheets of all the units being alike in size and fitting into the boxing, each sheet having a plurality of dome-shaped cells, the openings of the cells of the sheets of a unit being in register with each other to form containers for containing the articles singly, each container being ovoidal in shape and elongated in a vertical direction, alternate units having different numbers of cells, the margins of the sheets of the units having the smaller number of cells being wider than the margins of the sheets of the units having the larger number of cells, the cells in one unit extending in the spaces between cells of the next following unit and engaging the corresponding sheet, and cushioning sheets, one on top and the other on the bottom of the tier of holding units, the top cushioning sheet abutting against the under side of the top of the boxing, and the bottom cushioning sheet resting on the bottom of the boxing, the said cushioning sheets having dome-shaped half cells extending in the spaces of the adjacent cells of the bottom and top units and in contact with the corresponding sheets.

11. In a packing crate for eggs, fruits and like articles, two superimposed units, each unit being formed of two approximately square sheets provided with complementary half cells, the half cells being uniformly spaced apart and the apexes of the cells being in contact with the opposed faces of the said sheets, one unit having a larger number of cells than the other unit, the openings of the cells of the sheets of a unit being in register with each other to form containers for containing the articles singly, each container being ovoidal in shape, the elongation being in a vertical direction.

12. In a packing crate for eggs, fruits and like articles, two superimposed units, each unit being formed of two approximately square sheets provided with complementary half cells, the half cells being uniformly spaced apart and the apexes of the cells being in contact with the opposed faces of the said sheets, one unit having a larger number of cells than the other unit, the marginal half cells of one sheet of the unit having the larger number of cells encompassing the marginal half cells of the opposite sheet of the unit having the smaller number of cells, the openings of the cells of the sheets of a unit being in register with each other to form containers for containing the articles singly, each container being ovoidal in shape, the elongation being in a vertical direction.

In testimony whereof, I affix my signature, in presence of two witnesses.

EDWIN R. GILL.

Witnesses:
H. S. MACKAYE,
KATHARINE C. MEAD.